United States Patent [19]

Villata et al.

[11] Patent Number: 4,522,286
[45] Date of Patent: Jun. 11, 1985

[54] BRAKE CONTROL DEVICE

[76] Inventors: Gino Villata, Via Moriondo, 24, 14021 Buttigliera d'Asti; Oreste Becchio, Via San Giuseppe, 1, 12030 Caramagna Piemonte, both of Italy

[21] Appl. No.: 369,636

[22] Filed: Apr. 19, 1982

[30] Foreign Application Priority Data

Apr. 17, 1981 [FR] France .................................. 81 07811

[51] Int. Cl.³ ............................................. F16D 55/08
[52] U.S. Cl. ...................................... 188/72.7; 74/107
[58] Field of Search ................. 74/107, 516, 519, 567, 74/569; 188/72.7–72.9, 106 F

[56] References Cited

U.S. PATENT DOCUMENTS 1,408,993  3/1922  Eberhardt .
1,558,769  10/1925 Aitken .
2,390,875  12/1945 Firth .
3,047,318  7/1962  Berkshire .
3,904,301  9/1975  Schroeder .
4,072,448  2/1978  Loyd, Jr. .
4,228,664  10/1980 McCoy .

FOREIGN PATENT DOCUMENTS 1258209  1/1968  Fed. Rep. of Germany .
2330049  12/1973 Fed. Rep. of Germany .
2304018  8/1974  Fed. Rep. of Germany .
 668710  3/1952  United Kingdom ............... 188/72.7

Primary Examiner—Duane A. Reger
Attorney, Agent, or Firm—Young & Thompson

[57] ABSTRACT

A brake control device suitable for applying a parking or emergency brake for a motor vehicle has a push-rod slidably engaged with a support and movable between an extreme position of rest, and an extreme braking position in which it applies a brake pad to a corresponding friction track formed on a braking member such as a brake disc. The push-rod is operated by a lever which is connected to the push-rod by a cam device mounted on the support.

16 Claims, 10 Drawing Figures

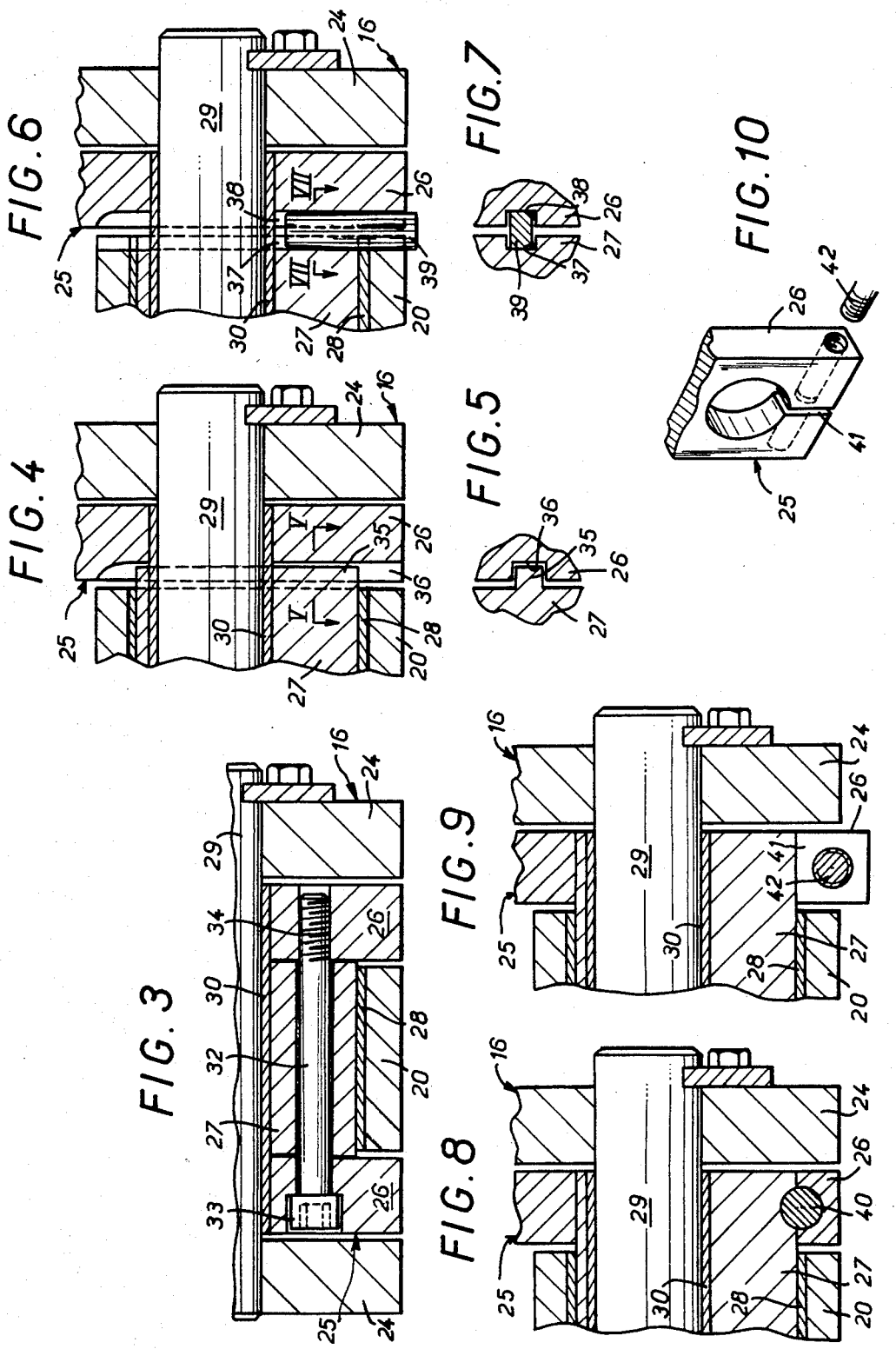

BRAKE CONTROL DEVICE

BACKGROUND OF THE INVENTION

The present invention relates to a brake control device of the kind in which at least one friction element is designed to be pressed against a rotatable friction track under the action of a push-rod slidable relative to a support between an extreme position of rest and an extreme braking position.

Such a control device is especially useful for the brakes of a motor vehicle, particularly, but not exclusively to control the operation of a parking or emergency brake.

The object of the present invention is to provide a brake control of this kind, which has a simple construction and operates very efficiently.

SUMMARY

According to the invention, a brake control device in which at least one friction element is designed to be applied against a rotatable friction track under the action of a push-rod slidably engaged with a support body for movement between an extreme position of rest and an extreme braking position is characterised in that it comprises a lever connected to the push-rod by a cam means consisting, on the one hand, of a core fixed to the level by assembly means and rotatably mounted on the push-rod, and, on the other hand, of a cylindrical journal mounted on the body, the lever and the core being rotatably mounted about the cylindrical journal, and the core having a cylindrical outer surface offset relative to said cylindrical journal.

By means of this arrangement, an excellent stepping-down of the mechanism is obtained, together with a reduction in size. More particularly, the construction is very compact and enables the control device to be installed without difficulty within the brake.

According to a preferred embodiment, the support body has two spaced brackets between which a yoke formed by the lever is located, and the push-rod and the core are located within this yoke.

In one embodiment, the support body forms a floating stirrup having a bearing portion disposed opposite the push-rod for a second friction element which interacts with a second rotating track opposed to the first.

BRIEF DESCRIPTION OF THE DRAWINGS

FIGS. 3 and 4 are partial views similar to FIG. 2, but relating respectively to two alternative forms;

FIG. 5 is a partial view in a section along the line V—V of FIG. 4;

FIG. 6 is a view similar to FIG. 4, but relating to another alternative form;

FIG. 7 is a partial view in a section along the line VII—VII of FIG. 6;

FIGS. 8 and 9 are partial views similar to FIGS. 2, 3, 4 and 6, but relating respectively to two further alternative forms; and FIG. 10 shows in perspective a detail of FIG. 9.

DETAILED DESCRIPTION OF THE PREFERRED EMBODIMENTS

Figure 1:
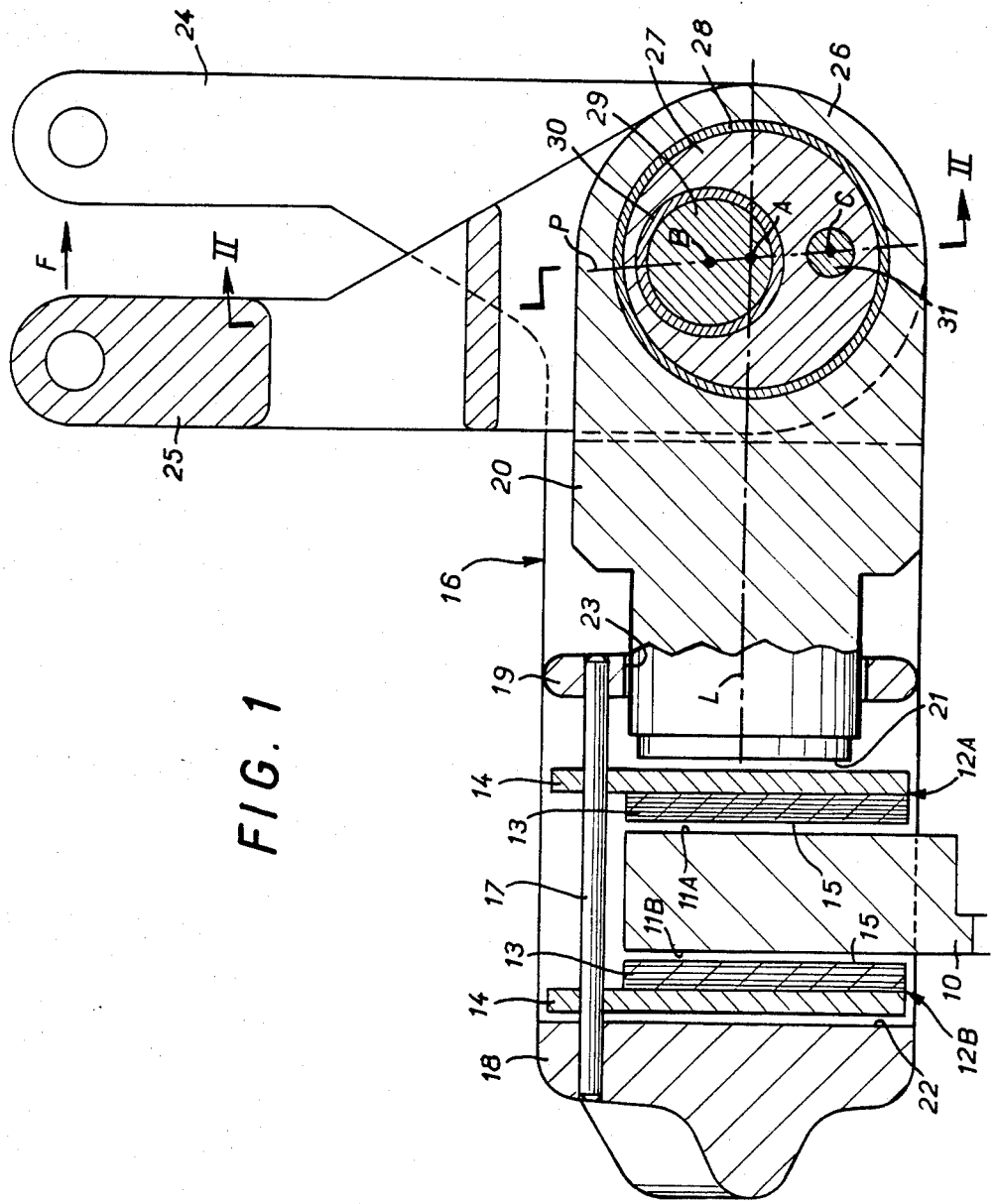
FIG. 1 is a diagrammatic view of a brake and its control device according to the invention in a section along the line I—I of FIG. 2.
Figure 2:
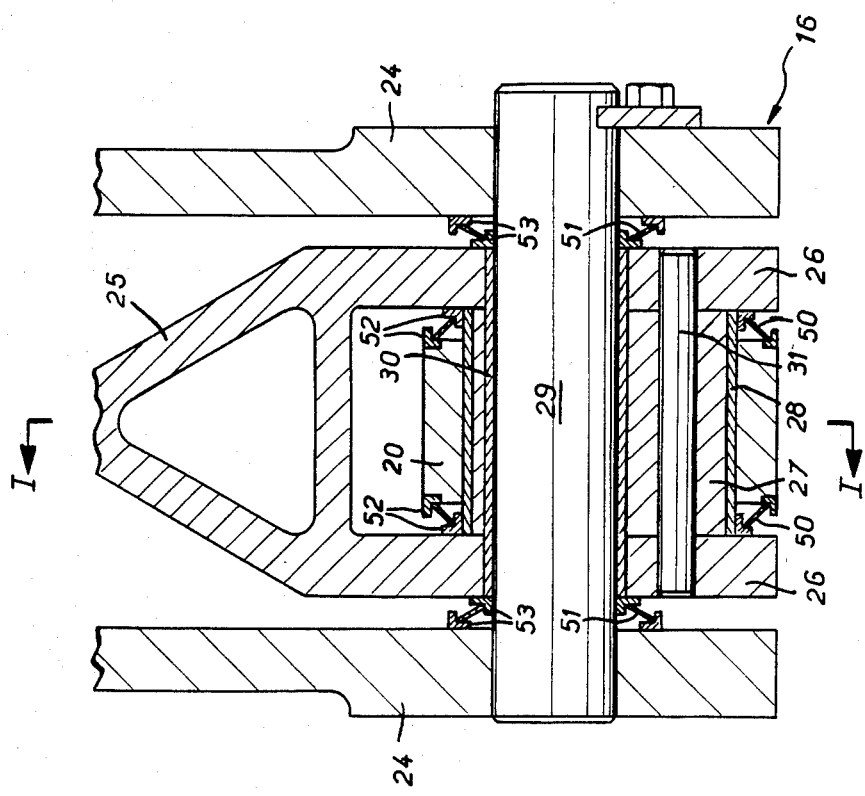
FIG. 2 is a view of this brake and its control device in a section along the broken line II—II of FIG. 1.

The embodiment illustrated in FIGS. 1 and 2 relates, by way of a non-limiting example, to the application of the invention to a control device for a parking brake, fitted to a disc brake for a motor vehicle.

FIG. 1 shows at 10 the brake disc which has two opposing rotating friction tracks 11A and 11B designed for receiving frictionally two frictional elements 12A and 12B consisting of brake pads. Each pad 12A, 12B has a lining made of friction material 13 fixed to a support 14. Each pad 12A, 12B is allowed to be applied against the corresponding friction track 11A, 11B of the disc 10 via the surface 15 of the lining 13 which is opposite the support 14. The force is transmitted by the support 14 to each pad 12A, 12B so as to press it against the disc 10.

The brake has a floating stirrup 16 which extends over the disc 10 and in which the pads 12A and 12B are mounted. The supports 14 of the pads 12A and 12B are mounted to slide on rods 17 carried by an end web 18 and by an intermediate web 19 of the stirrup 16.

The stirrup 16 forms a support body on which a push-rod 20 is engaged to slide between an extreme position of rest and an extreme braking position.

The push-rod 20 has an outer face 21 by means of which it can push on the support 14 of the pad 12A. The web 18 of the body 16 also has a reaction face 22 against which the support 14 of the other pad 12B is brought to bear.

The push-rod 20 is guided to slide on the support body 16 by engagement in an opening 23 in the web 19.

The support body 16 has two spaced brackets 24 (FIGS. 1 and 2) between which a control lever 25 is located. The lever 25 is in the form of a yoke with two arms 26. The push-rod 20 is engaged between the two arms 26 of the lever 25. It is rotatably mounted about cam means comprising a core 27 which has a cylindrical surface defined by a self-lubricating ring 28.

The body 16 carries a cylindrical journal 29 which extends between the brackets 24, and the outer cylindrical surface of which is defined by a self-lubricating ring 30. The cylindrical surfaces 28 and 30 are offset, or eccentric, relative to one another. FIG. 1 shows at A the axis of the cylindrical surface 28 and at B the axis of the cylindrical surface 30.

On the one hand, the two arms 26 of the lever 25 and, on the other hand, the core 27 located between these two arms 26 are rotatably mounted about the cylindrical journal 29.

The core 27 is fixed to the arms 26 of the lever 25 by assembly means comprising a spindle 31 extending between the branches 26 and passing through the core 27. The spindle 31 is parallel to the axis of the core 27 and consists of a gudgeon pin fitted into the arms 26 of the lever 25 and into the core 27, this being a force-fit in one and/or the other of the arms 26 and/or in the core 27. FIG. 1 shows at C the axis of the spindle 31. It will be noted in FIG. 1 that the axes A, B and C are coplanar and that the axis A of the core 27 is located between the axis B of the journal 29 and the axis C of the spindle 31. Preferably, the axis A of the core 27 and the axis B of the journal 29 define a plane P (FIG. 1) which is substantially perpendicular to the sliding axis L of push-rod 20 half-way along the travel of the push-rod 20 between its extreme position of rest and its extreme braking position. In such a position, the lever 25 extends in a direction substantially perpendicular to this axis L.

A leak-proof seal is provided (FIG. 2) by cup springs 50 arranged between the push-rod 20 and the arms 26 and by cup springs 51 arranged between the arms 26 and the brackets 24. Each cup spring 50 extends between two bearing washers 52, while each cup spring 51 extends between two bearings washers 53. The bearing washers 52 and 53 are made, for example, of plastic or bronze.

The various washers 50, 51, 52 and 53 make it possible not only to ensure a leak-proof seal of the self-lubricating rings 28 and 30 even under difficult temperature and environmental conditions, but also to ensure correct positioning, without untoward friction, of the push-rod 20 between the arms 26 and of the lever 25 between the brackets 24.

In the position of rest, the push-rod 20 is retracted to the right in FIG. 1 and is at a distance from the pad 12A. The brake is released, as shown in FIG. 1.

For braking, the lever 25 is actuated in the direction of the arrow F to the right in FIG. 1.

As a result of the eccentric assembly 27, 29, the push-rod 20 is forced to the left in FIG. 1 and exerts a direct pressure on the pad 12A and, by means of a reaction effect of the face 22, an indirect pressure on the pad 12B, the effect of this being to grip the disc 10 between the pads 12A and 12B. The brake is applied.

The compact construction of the control according to the invention, as well as its efficient operation, together with the excellent stepping-down effect, will be understood.

Reference will now be made to FIG. 3 in which the arrangement is similar to that just described with reference to FIGS. 1 and 2, but in which the assembly means comprising the spindle is formed not by a gudgeon pin 31, but by a screw 32 which passes through the core 27 and which has a head 33 recessed into one of the arms 26, and a threaded end 34 screwed into the other arm 26.

In another alternative form (FIGS. 4 and 5), the core 27 is fixed to at least one of the arms 26 of the lever 25 as a result of the engagement of a diametral tenon 35 of the core 27 in a diametral mortise 36 of the arm 26. It should be noted that the mortise could be formed in the core 27 and the tenon in the arm 26, or alternatively, as shown in FIGS. 6 and 7, the core 27 and the arms 26 have respectively two diametral mortises 37 and 38 facing one another, in which a diametral pin 39 is engaged.

In another alternative form (FIG. 8), the core 27 is fixed to the lever 25 by a key 40 which is perpendicular to the axis of the core 27 and which is engaged partially in the core 27 and partially in an arm 26 of the lever 25.

In yet another alternative form (FIGS. 9 and 10), the core 27 is fixed to the lever 25 as a result of a gripping effect by means of a slit 41 which is made in an arm 26 of the lever 25 and which can be closed up by means of a screw 42.

We claim:

1. A brake control device of the kind operable to apply at least one friction element against a rotatable friction track, comprising a support, a push-rod slidably engaged with said support for movement between an extreme position of rest, and an extreme braking position in which said push-rod applies said at least one friction element against the friction track, a lever connected to the push-rod by cam means, said cam means comprising on the one hand a core fixed to said lever and rotatably mounted on said push-rod and, on the other hand, a cylindrical journal mounted on the support, said core being rotatably mounted about said cylindrical journal and having a cylindrical outer surface which is eccentric relative to said cylindrical journal, said core and said lever consisting of two separate parts which are mounted side by side for conjoint rotation about said journal, and assembly means by which said core and lever are fixed to each other.

2. A brake control device according to claim 1, wherein said assembly means comprise spindle means disposed parallel to the axis of the core.

3. A brake control device according to claim 2, wherein the axes of the core, the journal and the spindle means are coplanar.

4. A brake control device according to claim 2, wherein the axis of the core is located between the axis of the journal and the axis of the spindle means.

5. A brake control device according to claim 2, wherein the spindle means comprise a force-fitted gudgeon pin.

6. A brake control device according to claim 2, wherein the spindle means comprise a screw.

7. A brake control device according to claim 1, wherein said assembly means comprise a tenon engaging in a mortise in a diametral direction.

8. A brake control device according to claim 1, wherein said assembly means comprise a pin.

9. A brake control device according to claim 1, wherein said assembly means comprise a key disposed perpendicular to the axis of the core.

10. A brake control device according to claim 1, wherein said assembly means comprise a frictional connection provided by a slit formed in the lever which can be closed up by a screw.

11. A brake control device according to claim 1, wherein the axes of the core and of the journal define a plane which is substantially perpendicular to the sliding axis of the push-rod half-way along the travel thereof between its extreme position of rest and its extreme braking position.

12. A brake control device according to claim 1, wherein said support has two spaced brackets between which a yoke formed by the lever is located, and the push-rod and the core are located within this yoke.

13. A brake control device according to claim 1, wherein said lever extends in a direction substantially perpendicular to the sliding axis of the push-rod half-way along the travel thereof between its extreme position of rest and its extreme braking position.

14. A brake control device according to claim 1, wherein said core and said lever are in play-free relation to said journal.

15. A brake control device according to claim 2, wherein said cylindrical journal and said spindle means are disposed within and extend endwise axially beyond said core.

16. A brake control device according to claim 15, wherein said cylindrical journal and said spindle means are spaced apart from each other by a portion of said core.

* * * * *